US009843849B1

(12) United States Patent
Lasnier de Lavalette

(10) Patent No.: US 9,843,849 B1
(45) Date of Patent: Dec. 12, 2017

(54) SPEAKER MOUNTING

(71) Applicant: Christian Lasnier de Lavalette, Lake Worth, FL (US)

(72) Inventor: Christian Lasnier de Lavalette, Lake Worth, FL (US)

( * ) Notice: Subject to any disclaimer, the term of this patent is extended or adjusted under 35 U.S.C. 154(b) by 0 days.

(21) Appl. No.: 15/470,318

(22) Filed: Mar. 27, 2017

Related U.S. Application Data

(63) Continuation-in-part of application No. 29/582,185, filed on Oct. 25, 2016.

(51) Int. Cl.
*H04R 1/02* (2006.01)
*F16M 13/02* (2006.01)

(52) U.S. Cl.
CPC ............. *H04R 1/025* (2013.01); *F16M 13/02* (2013.01); *H04R 2201/021* (2013.01)

(58) Field of Classification Search
CPC .......................... H04R 1/025; H04R 2201/021
USPC ... 248/222.51, 222.52, 222.13, 221.12, 27.1; 381/87, 335, 336, 332, 387
See application file for complete search history.

(56) References Cited

U.S. PATENT DOCUMENTS

| | | | | |
|---|---|---|---|---|
| 3,082,985 A * | 3/1963 | Herdman | A61J 9/0638 | 248/103 |
| D230,235 S * | 2/1974 | Green | D6/710 | |
| 3,859,480 A | 6/1975 | Birkner et al. | | |
| 4,032,725 A | 6/1977 | McGee | | |
| D256,915 S | 9/1980 | Needleman | | |
| 4,372,517 A * | 2/1983 | Welch | F02F 7/0068 | 248/221.12 |
| 4,385,577 A * | 5/1983 | Graham | D05B 73/00 | 112/258 |
| 4,773,788 A * | 9/1988 | Ruhl | B29C 31/006 | 403/24 |
| 4,784,046 A * | 11/1988 | Gautier | B60T 13/5675 | 248/222.41 |
| 4,852,178 A * | 7/1989 | Inkman | H04R 1/025 | 181/171 |
| 4,881,850 A * | 11/1989 | Abreo, Jr. | E21B 41/10 | 166/338 |
| 4,997,059 A * | 3/1991 | See | H04R 1/025 | 181/141 |
| 5,143,339 A | 9/1992 | Ashcraft et al. | | |
| 5,273,243 A * | 12/1993 | Abdallah | B60R 11/0217 | 181/141 |
| 5,608,809 A | 3/1997 | Ueda | | |
| 5,688,030 A * | 11/1997 | McAnally | G06F 1/181 | 248/500 |
| 5,734,732 A | 3/1998 | Lemmon | | |
| 6,217,248 B1 * | 4/2001 | Reiff | H02K 15/09 | 242/433.4 |
| 6,398,179 B1 * | 6/2002 | Soles | B60G 11/28 | 248/222.51 |

(Continued)

*Primary Examiner* — Eret C McNichols
(74) *Attorney, Agent, or Firm* — Payam Moradian

(57) ABSTRACT

Provided is a speaker mounting comprising a) a disc with a central opening and a solid portion around the central opening; b) at least one retainer opening on the solid portion of the disc; c) a retainer attached to the solid portion on one side of the disc around the retainer opening; d) at least one fastener opening for attaching the speaker to a support structure; wherein the speaker is attached to the speaker mounting by having a fastener that is attached to the speaker be secured by the retainer.

19 Claims, 8 Drawing Sheets

(56) References Cited

U.S. PATENT DOCUMENTS

| | | | | |
|---|---|---|---|---|
| 6,416,248 | B1 * | 7/2002 | Clark | E01F 9/635 116/63 R |
| 6,456,722 | B1 | 9/2002 | Davey et al. | |
| 6,616,369 | B2 * | 9/2003 | Clark | E01F 9/681 116/63 R |
| 7,177,438 | B2 * | 2/2007 | Iwaya | B60R 11/0217 381/302 |
| 7,298,863 | B2 * | 11/2007 | Kirihara | B60R 11/0217 381/302 |
| 7,387,002 | B2 * | 6/2008 | Clark | F04B 53/003 248/560 |
| 7,401,755 | B2 * | 7/2008 | Wu | H05K 5/0204 248/222.51 |
| 7,599,510 | B2 * | 10/2009 | Ueda | H04R 9/02 335/222 |
| 7,940,948 | B2 * | 5/2011 | Campbell, Jr. | B60R 11/0223 181/171 |
| 8,286,749 | B2 * | 10/2012 | Stewart, Jr. | H04R 1/025 181/150 |
| 8,325,937 | B2 * | 12/2012 | Kuriakose | H04R 1/028 340/384.1 |
| 8,622,590 | B2 * | 1/2014 | Cheng | F21V 29/004 248/222.51 |
| 8,763,966 | B2 * | 7/2014 | Stupnik | F04B 39/121 248/221.11 |
| 8,800,799 | B1 * | 8/2014 | Hawker | B65D 7/06 109/51 |
| 9,027,892 | B2 * | 5/2015 | Boer | B60R 11/0235 248/222.52 |
| 9,062,869 | B2 * | 6/2015 | Lay | F21V 21/03 |
| 9,479,852 | B2 * | 10/2016 | Yang | H04R 1/025 |
| 2004/0190736 | A1 * | 9/2004 | Gelow | H04R 1/34 381/182 |
| 2005/0047604 | A1 | 3/2005 | Wright | |
| 2005/0241876 | A1 | 11/2005 | Sperle et al. | |
| 2007/0098204 | A1 * | 5/2007 | Iekura | B60R 11/0223 381/386 |
| 2007/0102605 | A1 * | 5/2007 | Vela | B60T 13/567 248/221.12 |
| 2013/0161452 | A1 * | 6/2013 | Park | B60R 11/0217 248/27.1 |

* cited by examiner

SPEAKER MOUNTING

CROSS-REFERENCE

The present application is a continuation-in-part of design application No. 29/582,185, filed, on Oct. 25, 2016, which is incorporated herein by reference in its entirety.

BACKGROUND SECTION OF THE INVENTION

A problem with mounting speakers on a support structure is that they require a skilled worker and may require substantial amount of time and resources. After mounting the speaker, the speaker may not be stable, and may not be easily removable from the mount. There is a need in the art for a speaker mount that allows a speaker to be retained in a stable fashion without the need for substantial amount of time and resources.

SUMMARY SECTION OF THE INVENTION

Provided is a speaker mounting comprising a) a disc with a central opening and a solid portion around the central opening; b) at least one retainer opening on the solid portion of the disc; c) a retainer attached to the solid portion on one side of the disc around the retainer opening; d) at least one fastener opening for attaching the speaker to a support structure; wherein the speaker is attached to the speaker mounting by having a fastener that is attached to the speaker be secured by the retainer. The disc and the retainer can be made from different materials. The retainer can be made from rubber. There can be four retainers. Each retainer opening can be surrounded by the retainer. Each retainer opening can be completely surrounded by the retainer. The retainer opening can have two round ends, with one round end having a smaller diameter. One end of the retainer opening can be configured to allow the fastener to traverse the disc and other end of the retainer is configured to keep the fastener in place. The retainer can protrude further at the end with the smaller diameter compared to the end with the larder diameter. The retainer can have a round first end and protrudes increasing while moving towards a second round end. The second end can have a uniform protrusion along the circumference of the round end. The retainer can be attached to the disc with an adhesive. The retainer can be made from a material that is stretchable. A portion of diameter of the disc covering the central opening can be greater than a portion covering one solid portion of the disc. A portion of diameter of the disc covering the central opening can be greater than a sum of two portions covering solid portions of the disc. The disc can be fabricated from one piece. The fastener from the speaker can traverse the disc, and the speaker is rotated to in relation to the mount to secure the speaker. The retainer opening can be placed closer to the central opening compared to the fastener openings, as measured by the center of the fastener openings and larger opening center for the retainer opening. A circular line on the disc with same center as the disc may not overlap with any portion of both the opening and the retainer opening.

Provided is a method of securing a speaker to a speaker mounting comprising: a) securing a disc to a support structure having a depression, the disc having i) a central opening and a solid portion around the central opening, ii) at least one retainer opening on the solid portion of the disc, iii) a retainer attached to the solid portion on one side of the disc around the retainer opening, iv) at least one fastener opening; b) traversing the disc by having a fastener attached to the speaker cross the fastener openings from one side to another side; and c) rotating the speaker in position.

DETAILED DESCRIPTION OF THE INVENTION

Provided is a speaker mounting 10 configured for mounting a speaker 7 on a support structure 12. The speaker mounting 10 allows the speaker 7 to be attached and removed from the mounting with relative ease and with minimal skill. The mounting 10 can be installed on any flat surface with a few fasteners 8.

Figure 1:
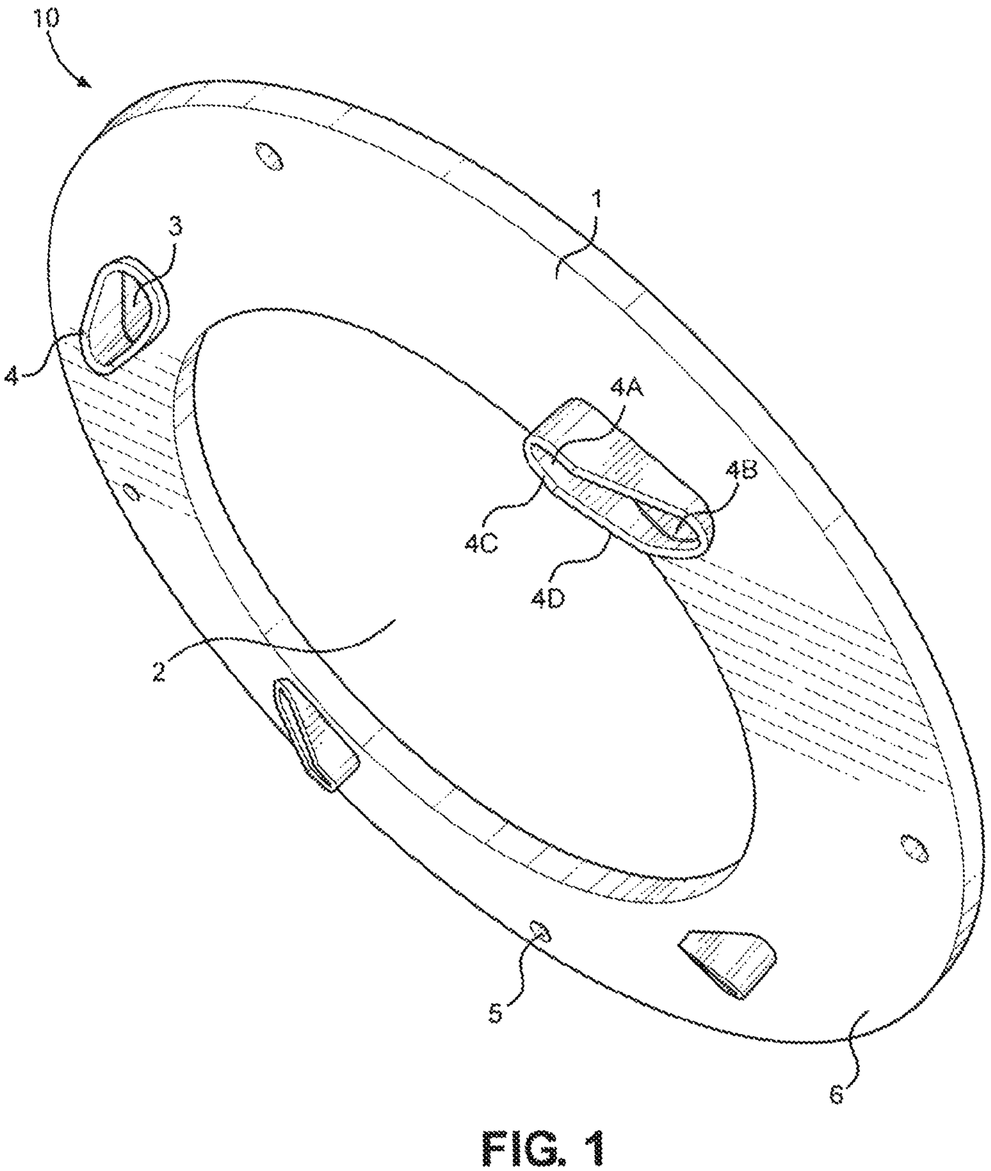
FIG. 1 illustrates a bottom perspective view of a Speaker Mounting.

FIG. 1 illustrates a bottom perspective view of a speaker mounting 10. The speaker mounting 10 is in form of disc 1 with a solid portion 6 and a central opening 2. The speaker mounting 10 can have a plurality of retainer openings 3 that are configured to hold a fastener 8 that is attached to speaker 7. The retainer openings 3 can be stadium/pear shaped with two round ends. One round end can have a smaller diameter 4A than the other round end 4B. The two round ends (4A, 4B) can be connected with two straight lines that project at varying heights.

Retainer 4 is placed around the retainer opening 3 and partially or completely surrounds the retainer opening 3. The retainer 4 protrudes further at the end with the smaller diameter 4A compared to the end with the larger diameter 4B. The retainer 4 has a round first end 4A that protrudes increasing while moving towards the second end. In other words, the retainer 4 has an elevating portion 4D that increases in height on both lengths (straight lines) when moving from the round end with the larger diameter 4B to the round end with the smaller diameter 4A. The protrusion (height) of retainer 4 is constant and most elevated all around the smaller round end 4A. The larger round end 4B with smaller protrusion is configured to allow the fastener from the speaker 7 to traverse the solid portion of the disc and the retainer, and then be held in place at the smaller end 4A with the uniform and higher protrusion. The retainer 4 can be made from a material that is elastic or stretchable. The elasticity allows for a firmer grip when a fastener 8 is placed in the smaller round end 4A to be held firmly. An example of such material is rubber. The disc 1 itself can be made from a hard plastic that is not elastic or stretchable.

The disc 1 can further have a plurality of fastener openings 5. The fastener openings 5 allow the speaker mounting 10 to be attached to a support structure 11. The support structure 11 can be configured to receive a speaker 7, such as by having an opening or depression that complements the central opening 2 of the speaker mounting 10.

In the arrangement illustrated in FIG. 1, four retainer openings 3 are spaced apart from each other in an equidistant manner. All the retainer openings 3 have the same configuration. A retainer 3 surrounds the entire circumference of each retainer opening 3. Four fastener openings 5, which in this case are small circular openings 5, are spaced apart from each other in an equidistant manner. Retainer openings 3 are placed in between the fastener openings 5, and vice versa, in an alternating arrangement. FIG. 1 also illustrates the disc 1 having minimal thickness (1 mm to 1 cm) and being flat. Retainer openings 3 are placed closer to central opening 2 fastener openings 5 are placed farther from central opening 2, so that a circular line on disc 1 with the same center as the disc does not overlap with any portion of both openings 5 and retainer openings 3.

Figure 2:
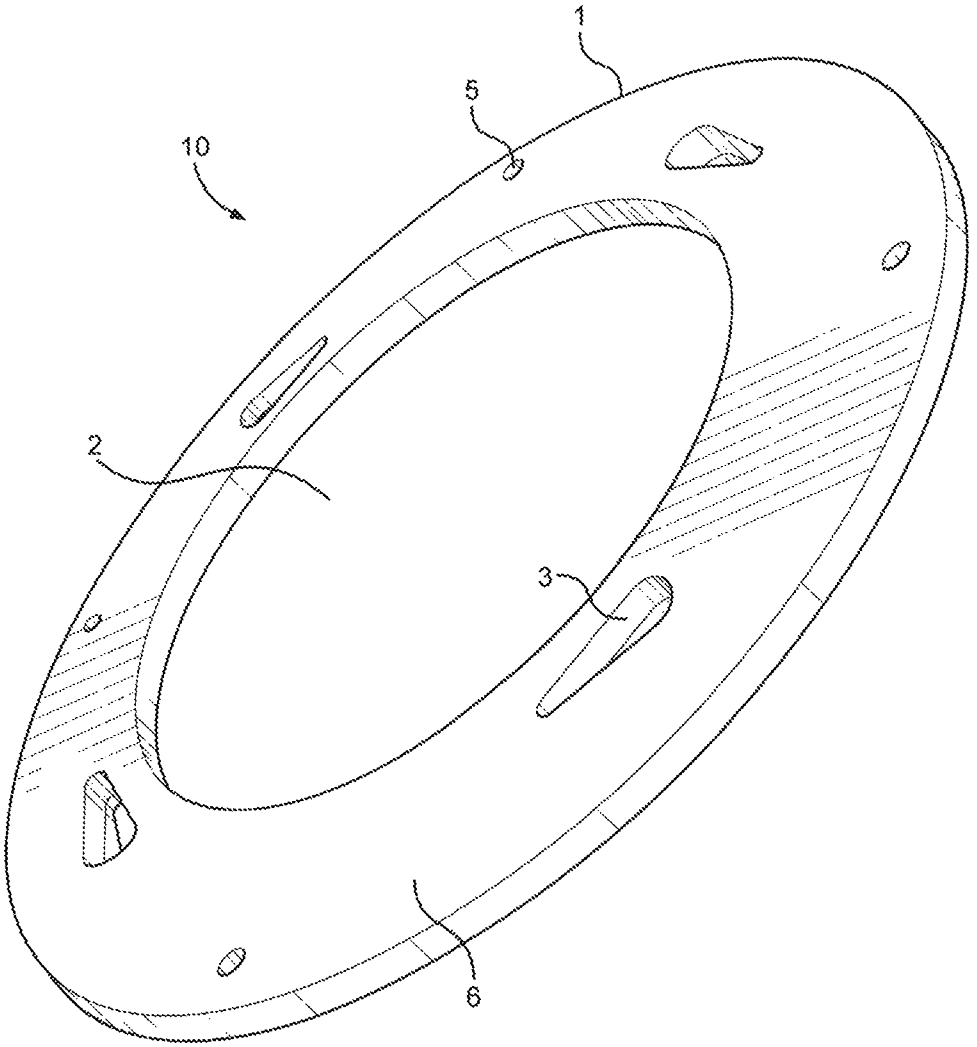
FIG. 2 illustrates a top perspective view of a Speaker Mounting.
Figure 3:
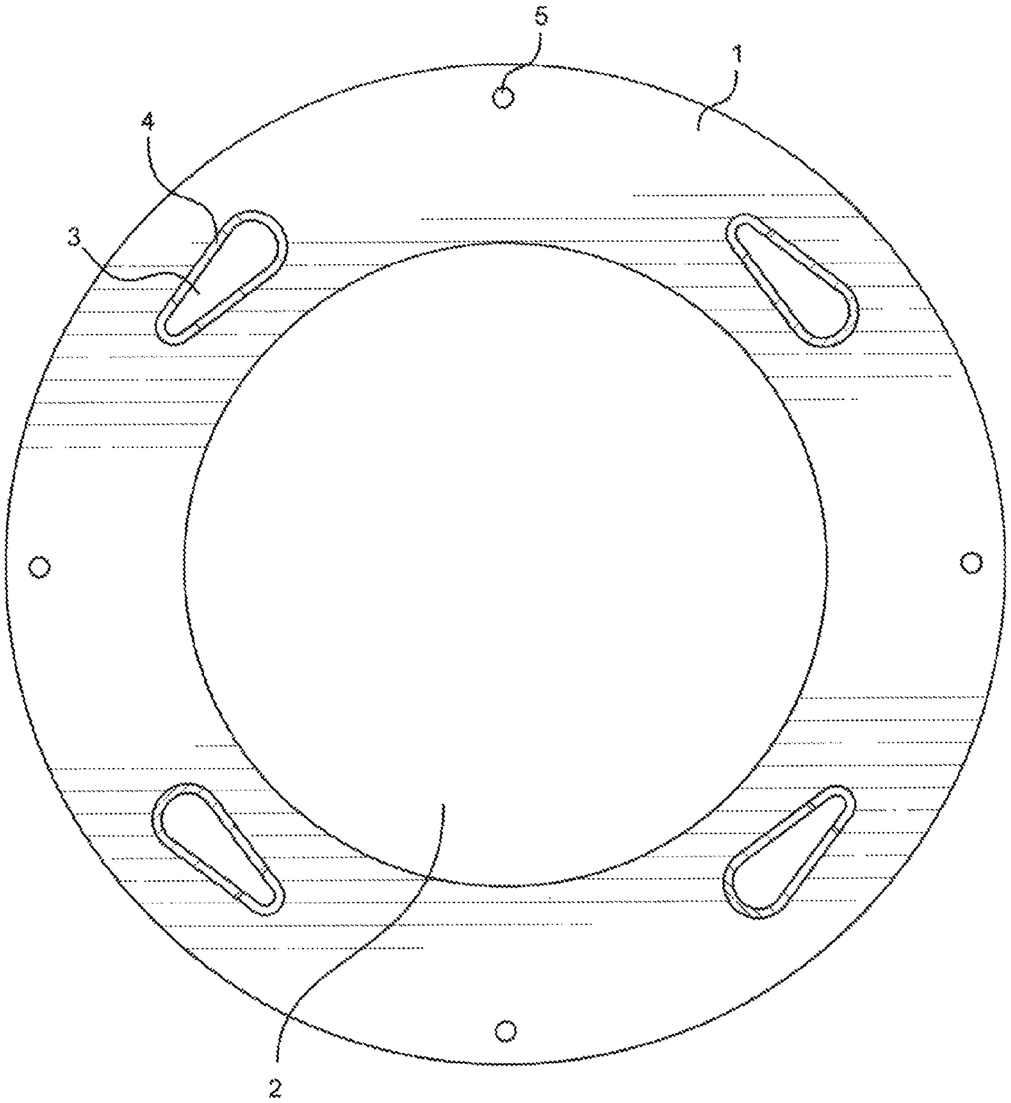
FIG. 3 illustrates a bottom plan view thereof.
Figure 4:
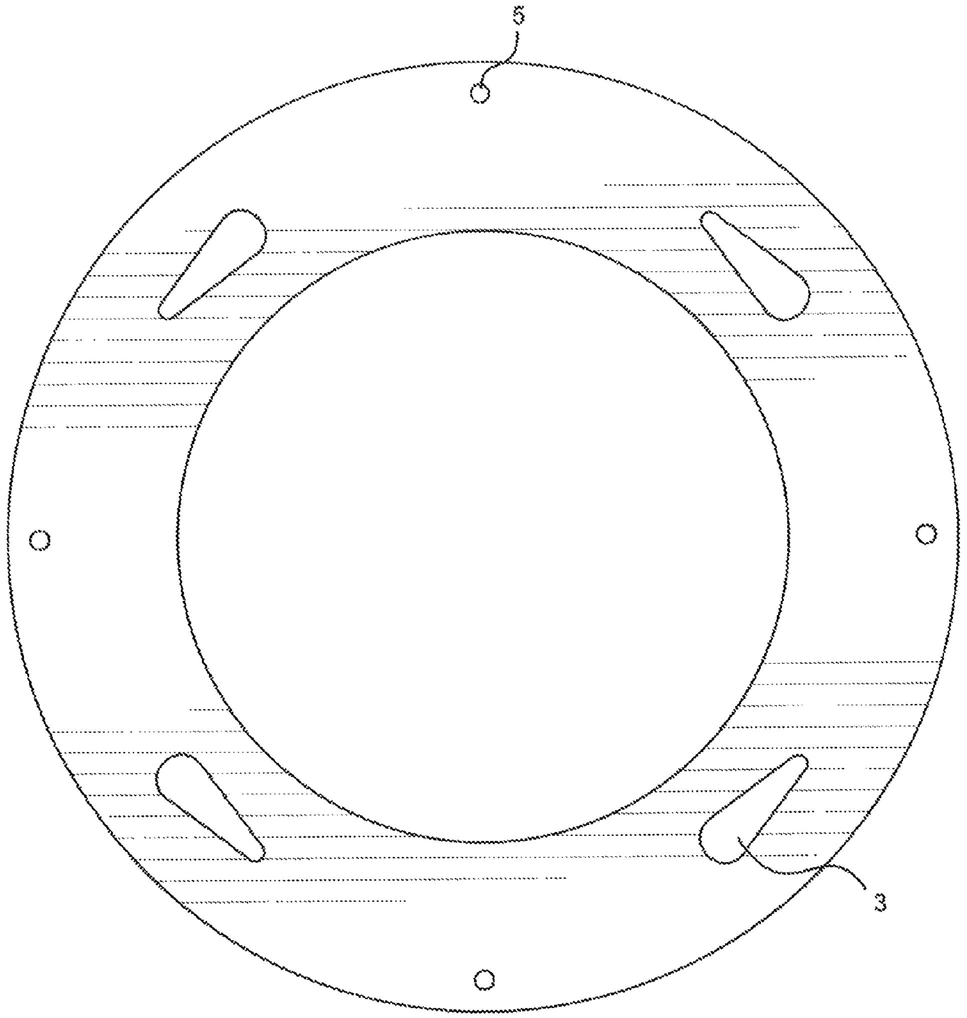
FIG. 4 illustrates a top plan view thereof.
Figure 5:
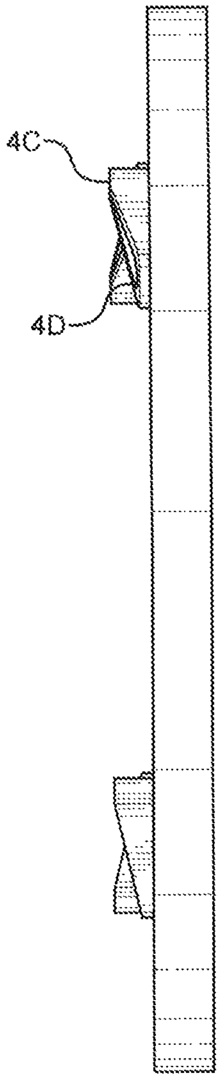
FIG. 5 illustrates a side view thereof.
Figure 6:
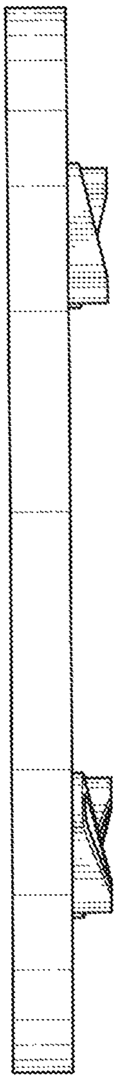
FIG. 6 illustrates a side view thereof.
Figure 7:
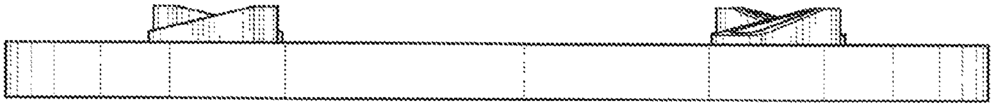
FIG. 7 illustrates a side view thereof.
Figure 8:
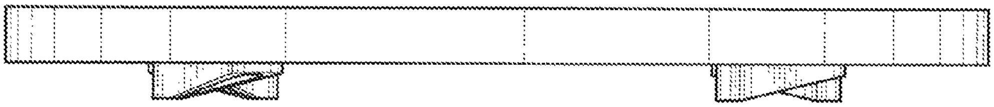
FIG. 8 illustrates a side view thereof.

FIG. 2 illustrates a top perspective view and FIG. 4 illustrates a top plan view of the speaker mounting 10. Visible in this view are the retainer openings 3 and fastener openings 5. FIG. 3 illustrates a bottom plan view. In this view, retainer opening 3, retainer 4, and fastener openings 5 are visible.

FIGS. 5, 6, 7, and 8 are side views of the speaker mounting 10. These figures illustrate the side profile of the retainer 4 with a portion that elevates 4D (increases in height) starting from the bigger round end 4B and moving to the smaller round end 4A. At the smaller round end 4A, the side profile has a horizontal portion 4C that is flat (uniform) and has the maximum height.

Figure 9:
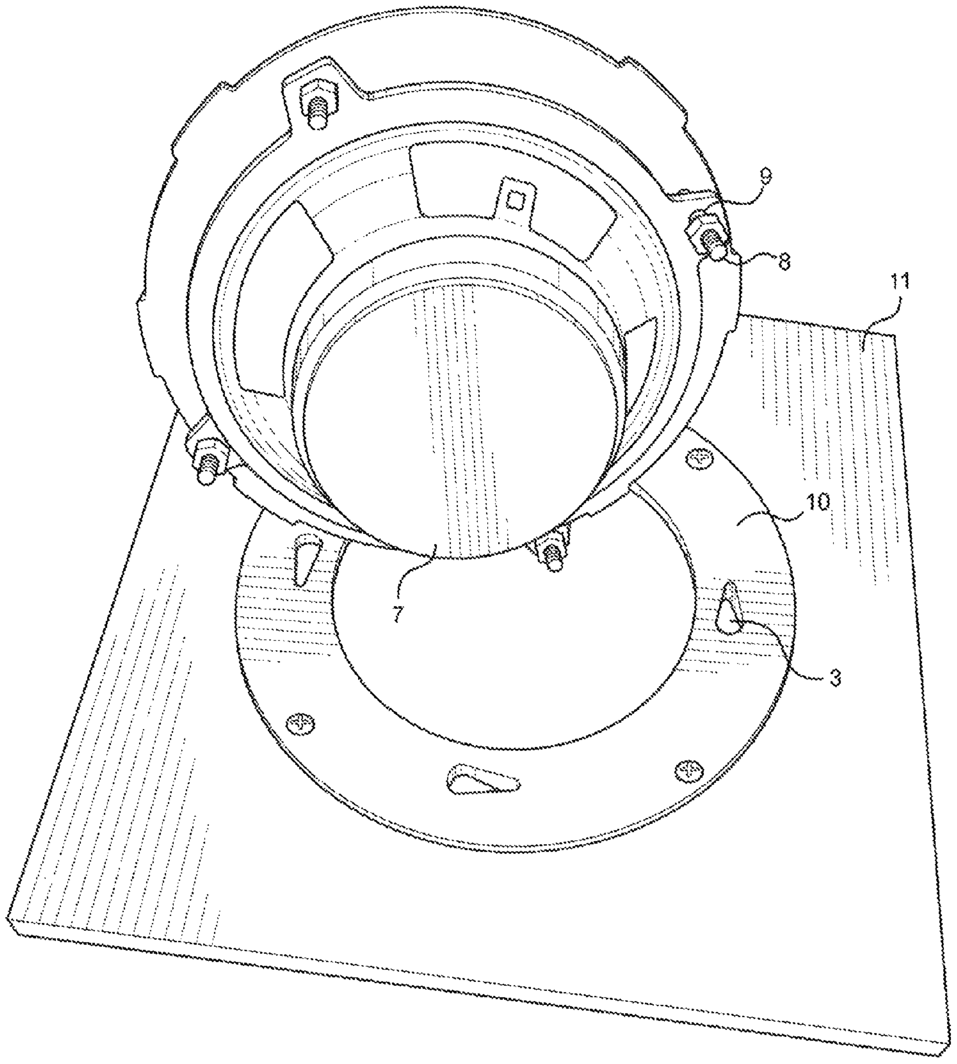
FIG. 9 illustrates attachment of a speaker to the speaker mount with fasteners.

FIG. 9 illustrates attachment of a speaker 7 to the speaker mount 10 with fasteners 8. A speaker 7 with a fastener 8 is aligned against the retainer openings 3 of the speaker mount. The fasteners 8 pass from one side of the retainer openings 3 to the other, usually in proximity to the round end of the retainer opening having the larger diameter 4B. The speaker 7 is then rotated in relation to the mount so that the fasteners 8 fit into the smaller opening 4A of the retainer. The rubber of the retainer can firmly hold in place the fastener 8. If the fastener 8 is a screw or has threading, the fastener 8 can further be tightened. Illustrated in this figure are speaker 7 with threaded bolt 8 and complementary threaded nut 9. A gap can exist between nut 9 and the speaker 8 so to create space for placement of the speaker mounting 10 in between. Bolt 8 alone or together with nut 9 is placed inside of retainer opening 3. The end of bolt 8 comes out on other side of speaker mounting 10. Nut 9 is then attached to the bolt 8 (if not pre-attached) and fastened (tightened). Bolt 8 with nut 9 can pass through retainer opening 3 on the larger side of the opening. Speaker 7 is then rotated to position bolt 8 with nut 9 on the smaller side 4A.

Figure 10:
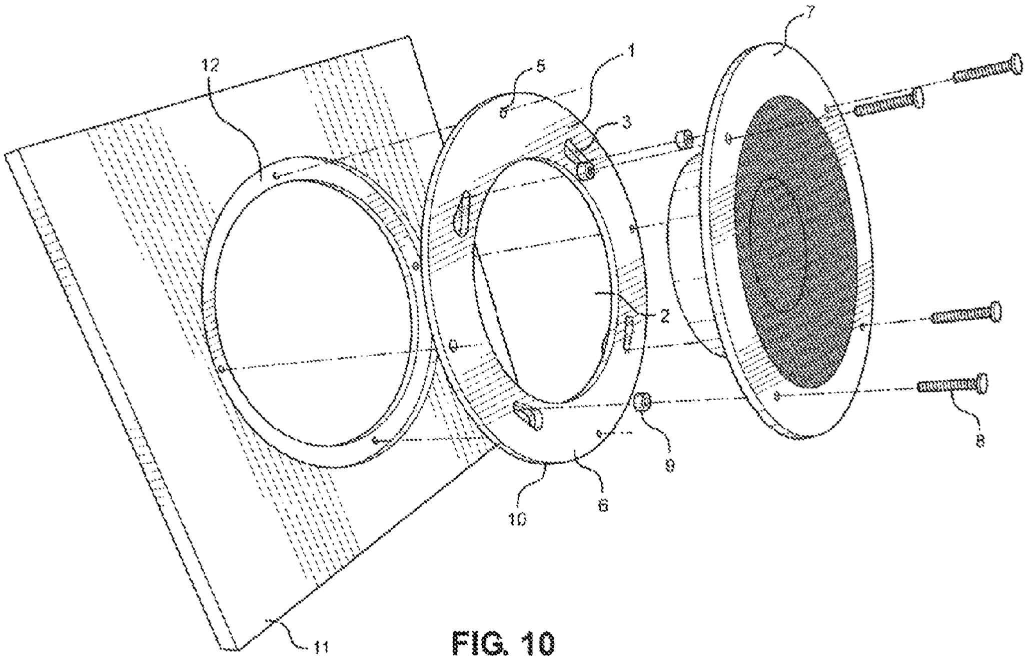
FIG. 10 illustrates an exploded view for attachment of a speaker to the speaker mount with fasteners.

FIG. 10 is an exploded view of the speaker mounting system 10. Speaker mounting 10 is placed in a circular depression 12 in support structure 11. The outer portion of solid portion 6 of disc 1 touches the support structure, and allows for fastening disc 1 to the support structure using fastener openings 5. Fastener openings 5 are placed on the periphery of disc 1. Retainer openings 3 are placed closer to central opening 2 on disc 1. Retainer openings align with the opening on support structure 11, and do not touch depression 12, allowing room and access to bolt 8 and nut 9 from behind support structure 11.

1. Disc
2. Central opening of disc
3. Retainer opening
4. Retainer
4A. Small round end of retainer
4B. Large round end of the retainer
4C. Horizontal portion of retainer
4D. elevating portion of the retainer.
5. Fastener opening
6. Solid portion of disc
7. Speaker
8. Bolt (fastener)
9. Nut (Fastener)
10. Speaker mounting
11. Support structure
12. Depression on support structure

What is claimed is:

1. A speaker mounting comprising
a) a disc with a central opening and a solid portion around the central opening;
b) at least one retainer opening on the solid portion of the disc;
c) a retainer attached to the solid portion on one side of the disc around the retainer opening;
d) at least one fastener opening for attaching a speaker to a support structure;
wherein the speaker is attached to the speaker mounting by having a fastener that is attached to the speaker be secured by the retainer, wherein the disc and the retainer are made from different materials.

2. The speaker mounting of claim 1, wherein the retainer is made from rubber.

3. The speaker mounting of claim 1, wherein there are four retainers.

4. The speaker mounting of claim 3, wherein each retainer opening is surrounded by the retainer.

5. The speaker mounting of claim 1, wherein each retainer opening is completely surrounded by the retainer.

6. The speaker mounting of claim 1, wherein the retainer opening has two round ends, with one round end having a smaller diameter.

7. The speaker mounting of claim 1, wherein the retainer has a first round end and a second round end, the second round end having a smaller diameter than the first round end, the first round end of the retainer opening configured to allow the fastener to traverse the disc and second round end of the retainer configured to keep the fastener in place.

8. The speaker mounting of claim 7, wherein the retainer protrudes further at the second round end with the smaller diameter compared to the end with the larger diameter.

9. The speaker mounting of claim 1, wherein the retainer has a first round first end and a second round end, and the retainer increasing in height while moving from the first end towards the second round end.

10. The speaker mounting of claim 9, wherein the second round end has a uniform height along the second round end.

11. The speaker mounting of claim 1, wherein the retainer is attached to the disc with an adhesive.

12. The speaker mounting of claim 1, wherein the retainer is made from a material that is stretchable.

13. The speaker mounting of claim 1, wherein the disc is fabricated from one piece.

14. The speaker mounting of claim 1, wherein the fastener from the speaker traverses the disc, and the speaker is rotated to in relation to the mount to secure the speaker.

15. The speaker mounting of claim 1, wherein the retainer openings have one or more round ends and each of the round ends as measured based on position of center of the round ends are placed closer to the central opening compared to the fastener openings, as measured by center of the fastener openings.

16. The speaker mounting of claim 15, wherein a concentric circular line on the disc does not overlap with any portion of both the opening and the retainer opening.

17. A speaker mounting comprising a) a disc with a central opening and a solid portion around the central opening;

b) at least one retainer opening on the solid portion of the disc;

c) a retainer attached to the solid portion on one side of the disc around the retainer opening;

d) at least one fastener opening for attaching a speaker to a support structure, wherein the speaker is attached to the speaker mounting by having a fastener that is attached to the speaker be secured by the retainer, wherein each retainer opening is surrounded by the retainer.

18. A speaker mounting comprising a) a disc with a central opening and a solid portion around the central opening;

b) at least one retainer opening on the solid portion of the disc;

c) a retainer attached to the solid portion on one side of the disc around the retainer opening;

d) at least one fastener opening for attaching a speaker to a support structure;

wherein the speaker is attached to the speaker mounting by having a fastener that is attached to the speaker be secured by the retainer, wherein the retainer is attached to the disc with an adhesive.

19. A speaker mounting comprising a) a disc with a central opening and a solid portion around the central opening;

b) at least one retainer opening on the solid portion of the disc;

c) a retainer attached to the solid portion on one side of the disc around the retainer opening;

d) at least one fastener opening for attaching a speaker to a support structure;

wherein the speaker is attached to the speaker mounting by having a fastener that is attached to the speaker be secured by the retainer, wherein the retainer openings have one or more round ends and each of the round ends as measured based on position of center of the round ends are placed closer to the central opening compared to the fastener openings, as measured by center of the fastener openings.

* * * * *